(12) United States Patent
Pellowski et al.

(10) Patent No.: US 9,003,432 B1
(45) Date of Patent: Apr. 7, 2015

(54) EFFICIENT MANAGEMENT OF KERNEL DRIVER PERFORMANCE DATA

(75) Inventors: Robert J. Pellowski, Ledyard, CT (US); Harold M. Sandstrom, Belmont, MA (US); Hitesh P. Trivedi, Cambridge, MA (US); Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 363 days.

(21) Appl. No.: 13/535,862

(22) Filed: Jun. 28, 2012

(51) Int. Cl.
*G06F 13/10* (2006.01)
*G06F 11/30* (2006.01)
*G06F 11/34* (2006.01)

(52) U.S. Cl.
CPC .......... *G06F 13/102* (2013.01); *G06F 11/3041* (2013.01); *G06F 11/3485* (2013.01)

(58) Field of Classification Search
USPC .................... 710/59; 719/321, 325, 326, 327
See application file for complete search history.

(56) References Cited

U.S. PATENT DOCUMENTS

| | | | |
|---|---|---|---|
| 6,983,452 B1 * | 1/2006 | Willems | 717/128 |
| 2007/0208849 A1 * | 9/2007 | Ely et al. | 709/224 |
| 2008/0244331 A1 * | 10/2008 | Grimes et al. | 714/48 |
| 2009/0259749 A1 * | 10/2009 | Barrett et al. | 709/224 |
| 2011/0055388 A1 | 3/2011 | Yumerefendi et al. | |
| 2012/0005580 A1 * | 1/2012 | Flemming et al. | 715/735 |
| 2012/0072575 A1 * | 3/2012 | King et al. | 709/224 |

OTHER PUBLICATIONS

Gaikwad et al., "Aquisition and Kernel Memory Storage of I/O Metrics," U.S. Appl. No. 13/341,348, filed Dec. 30, 2011.
Sandstrom et al, "Ordered Kernel Queue for Multipathing Events," U.S. Appl. No. 13/341,343, filed Dec. 30, 2011.

* cited by examiner

*Primary Examiner* — Brian W Wathen
(74) *Attorney, Agent, or Firm* — BainwoodHuang (57) ABSTRACT

An improved technique for managing access to performance data of a kernel driver includes acquiring performance data in the kernel driver over identified intervals of time marked by the kernel driver itself and transferring the performance data to a persistence manager outside the kernel, where client applications can access the performance data and/or post-processed versions thereof without disturbing the operation of the kernel driver.

23 Claims, 5 Drawing Sheets

EFFICIENT MANAGEMENT OF KERNEL DRIVER PERFORMANCE DATA

BACKGROUND

Host computers in data storage systems access storage arrays, such as disk arrays, at a high rate of speed and with high reliability. To meet the demanding requirements of such systems, host computers are typically equipped with kernel drivers for managing critical I/O activities. The kernel drivers run within the kernels of their host computers' operating systems and efficiently direct data READs and WRITEs to their respective storage arrays. Often, host computers are connected to their arrays through multiple paths, and the kernel drivers are specially configured to select paths dynamically for conveying I/O requests to the arrays, so as to provide load balancing and failover. An example of a kernel driver that supports multiple paths is the PowerPath® driver from EMC Corporation of Hopkinton, Mass.

In a typical scenario, a host computer runs an application on behalf of a user. The application executes commands, including instructions for reading from and writing to an array. The kernel driver receives these instructions in the form of I/O requests, which the kernel driver processes and directs to the array.

Some kernel drivers for managing I/O requests collect performance data. In one scenario, a kernel driver collects performance data and various clients running on the host computer outside the kernel access the kernel driver to extract the performance data and perform calculations.

SUMMARY

The kernel driver for handling I/O requests, e.g., from an application or other program running on the host computer, is typically positioned directly in the critical I/O stack of the host computer, i.e., between the application program and adapters connected to the storage array. Any demands on the kernel driver to perform tasks other than to process I/O requests thus have the potential to burden the kernel driver and impair throughput of the host computer in reading from or writing to the array.

Unfortunately, the actions of clients running on the host computer, or on other computers, can impair the kernel driver's performance when such clients call upon the kernel driver to access performance data. The kernel driver, upon receiving a request for performance data, typically freezes all I/O activity when it services the request. It has been observed that repeatedly freezing I/O activity, servicing requests, and unfreezing I/O activity can impair the efficiency of the kernel driver and impact throughput. Allowing multiple clients to access the kernel driver multiplies the negative impact on performance.

In contrast with the conventional approach, where clients frequently access a kernel driver to obtain performance data and thereby impair performance, an improved technique for managing access to performance data of a kernel driver includes acquiring performance data in the kernel driver over identified intervals of time marked by the kernel driver itself and transferring the performance data to a persistence manager outside the kernel, where client applications can access the performance data and/or post-processed versions thereof without disturbing the operation of the kernel driver. Communications with the kernel driver, and burdensome interruptions to I/O processing that follow, are thereby reduced, e.g., to once per sampling interval, allowing the kernel driver to perform its primary functions more efficiently. Additionally, collecting performance data in this manner promotes consistency among different clients, as all such clients operate based on a common set of performance data collected and processed once per interval for all such clients.

Some embodiments are directed to a method of managing access to performance data of a driver running in an operating system kernel. The method includes recording driver performance data within the kernel over a predetermined interval of time marked by a timer running within the kernel. The method further includes, after expiration of the timer, performing a collecting operation within the kernel to collect the recorded performance data and transferring the collected performance data to a persistence manager outside the kernel.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing access to performance data of a kernel driver includes acquiring performance data in the kernel driver over identified intervals of time marked by the kernel driver itself and transferring the performance data to a persistence manager outside the kernel, where client applications can access the performance data and/or post-processed versions thereof without disturbing the operation of the kernel driver, Using this technique, client applications can access a consistent set of performance data collected and processed once per interval for all such client applications.

Figure 1:
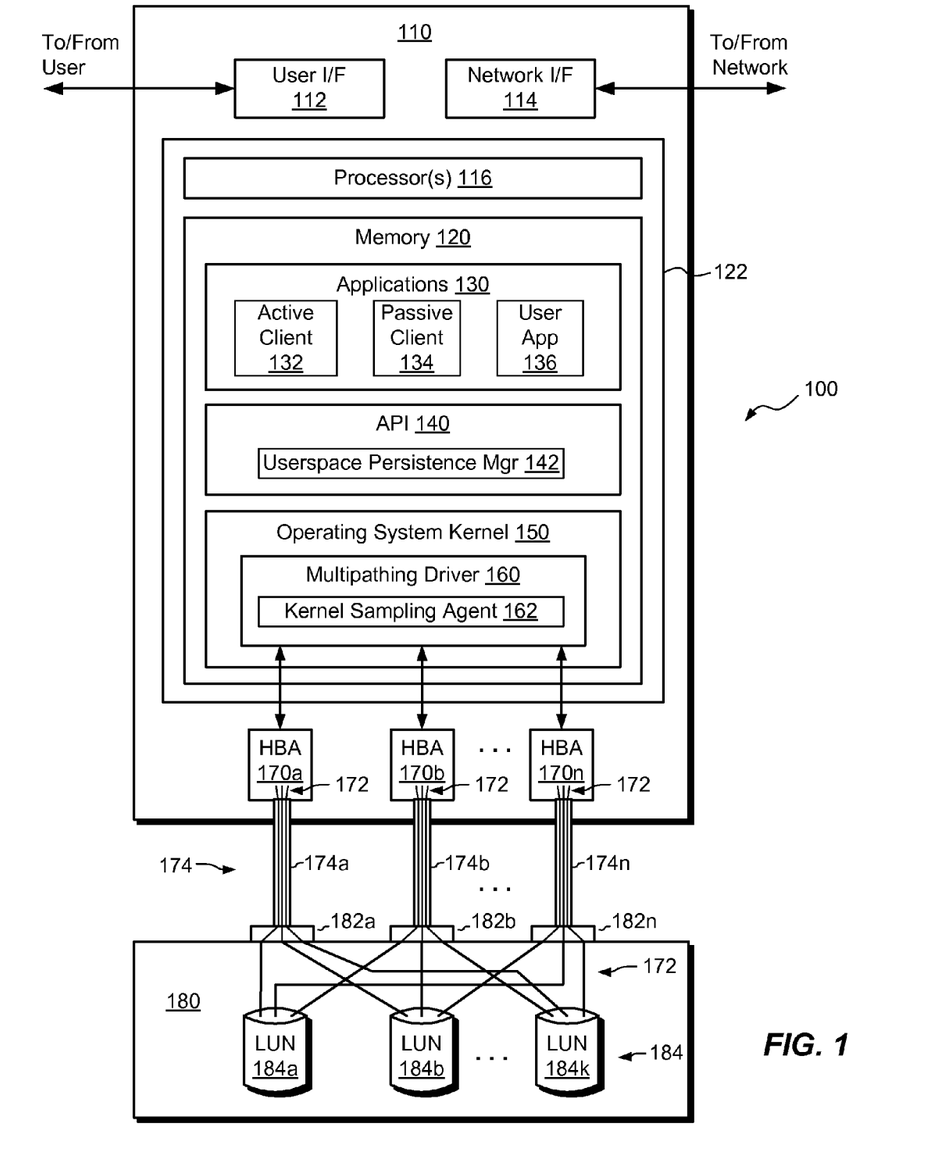
FIG. 1 is a block diagram of a simplified example electronic system including a host computing machine and a storage array.

FIG. 1 shows an example electronic environment 100 according to embodiments of the invention. The environment 100 includes a host computing system 110 coupled to a storage array 180 through a medium 174. The array 180 includes multiple logical units, or "LUNs 184a-k." Each of the LUNs 184a-k typically includes one or more disk drives, non-volatile solid state memory, and/or a combination of disk drives and solid state memory.

The host computing machine 110 (i.e., the "host") includes a user interface 112, such as a keyboard, pointer, and display, for interacting with a user, and a network interface 114, such as one or more network interface cards, for connecting to a computer network. The host 110 also includes a set of processors 116 (i.e., one or more processing chips and/or assemblies), memory 120, and a set of host bus adapters 170a-170n. The set of processors 116 and the memory 120 together form a specialized circuit 122 constructed and arranged to perform various functions as described herein.

The memory 120 stores code for applications 130, an API (application programming interface) 140, and an operating system kernel 150. The applications include an active client 132, a passive client 134, and a user application 136, for example. The API 140 provides access to a userspace persistence manager 142, and the operating system kernel 150 includes a multipathing driver 160. The multipathing driver 160 is thus a "kernel driver," which may be provided as a kernel extension of the host's operating system. In some examples, the multipathing driver 160 is implemented as an I/O filter driver. The multipathing driver 160 includes a kernel sampling agent 162. It is understood that the memory 120 may include a myriad of other constructs; however, such constructs are omitted from FIG. 1 for the sake of simplicity.

In some examples, the host bus adapters 170a-n are SCSI initiators and the array 180 includes SCSI targets 182a-n. SCSI Initiator-Targets (I-T's) 174a-n are provided within the medium 174 to connect the host bus adapters 170a-n to respective SCSI targets 182a-n. The I-T's 174a-n are also referred to herein as "buses."

Also shown in FIG. 1 are a number of SCSI I-T-L's (Initiator-Target-LUNs), which are referred to herein as "paths" 172. In this example, a total of nine paths 172 are shown. Each of the paths 172 extends from one of the host bus adapters 170a-n, through one of the respective buses 174a-n, to a respective one of the targets 182a-n, and to a respective one of the LUNs 184a-k. Providing different paths 172 to each respective LUN 184a-k of the array 180 affords the electronic environment 100 with redundancy, load balancing, and failover.

Although the host 110 is typically a server level computer, this is not required. The host 110 may be any type of computer or computing device. Also, while the applications 130 are typically of a type that are accessible to users via a graphical user interface (GUI) or command line interface (CLI), it is understood that the applications 130, or a subset of the applications 130, can be run independently of user interaction or in the background. For example, the applications 130 can be run as daemons, processes, or other software constructs. In some examples, the active client 132 and/or the passive client 134 are run off-host, i.e., on computing machines other than the host 110, which are connected to the host 110 via a computer network and the network interface 114. A variety of operating systems can be run on the host 110, with non-limiting examples including Microsoft Windows™, Unix, Red Hat Linux, or vSphere® from VMware®, for example.

In operation, the host 110 executes the user application 136. The user application 136 typically includes high level instructions for writing to and/or reading from the array 180. The host 110 translates these high level instructions into I/O requests, which are passed along an I/O stack of the host 110 to the multipathing driver 160. The multipathing driver 160 processes the I/O requests and forwards the I/O requests along the I/O stack, e.g., to HBAs 170a-n. The I/O requests are then sent via designated paths 172 to designated LUNs 184a-k on the array 180. Responses to I/O requests, such as data for READs and acknowledgements for WRITEs, are sent back from the array 180 to the multipathing driver 160.

As the multipathing driver 160 processes I/O requests, the multipathing driver 160 may collect performance data, such as numbers of I/O requests received, I/O sizes of READs and WRITEs, and latencies of READs and WRITEs (e.g., the amount of time required for an I/O request to propagate from the multipathing driver 160 to the array 180 and back). In some examples, the multipathing driver 160 stores certain types of performance data in the form of data bins or "buckets." For instance, rather than storing values of I/O size as individual numbers, which can consume valuable kernel space, data buckets are provided, wherein each bucket covers a particular range of values of I/O size. The ranges are contiguous and may be arranged linearly or logarithmically, for example. When an I/O request is processed, a counter is incremented for the bucket that covers the range of I/O sizes that includes that of the received I/O request. Data buckets can also be provided for I/O request latency. Different sets of buckets can be provided for READs and WRITEs, as well as for different paths 172 and/or for different LUNs 184a-k. Considerable space is conserved, as each value of I/O size and/or latency can be recorded simply as a count in a data bucket. A technique of this kind for collecting performance metrics using data buckets is described in U.S. patent application Ser. No. 13/341,348, filed Dec. 30, 2011, and entitled "AQUISITION AND KERNEL MEMORY STORAGE OF I/O METRICS," which is hereby incorporated by reference in its entirety.

As the user application 136 runs and the multipathing driver 160 continues to acquire performance data, the kernel sampling agent 162 performs collecting operations of the accumulated performance data according to a predetermined schedule. For example, the kernel sampling agent 162 takes periodic snapshots of the bucket counters at regular intervals and stores the snapshots in the kernel 150. In some examples, multiple snapshots of data buckets, as well as other performance data, are stored in the multipathing driver 160 (or elsewhere in the kernel 150) in connection with different time intervals.

Preferably, the active client 132 obtains snapshots of the performance data from the multipathing driver 160, e.g., in an event-driven manner, whereas the passive client 134 obtains performance data from the API 140. Once snapshots are obtained, the active client 132 post-processes the snapshots and stores the results in the userspace persistence manager 142, where they are available for access by one or more passive clients 134. Clients, both on and off the host 110, are thus able to access driver performance data from the userspace persistence manager 142. As the userspace persistence manager 142 resides outside the driver 160, the userspace persistence manager 142 can be accessed frequently by numerous clients without burdening the multipathing driver 160 or causing the multipathing driver 160 to be diverted from its primary function of processing I/O requests.

Figure 2:
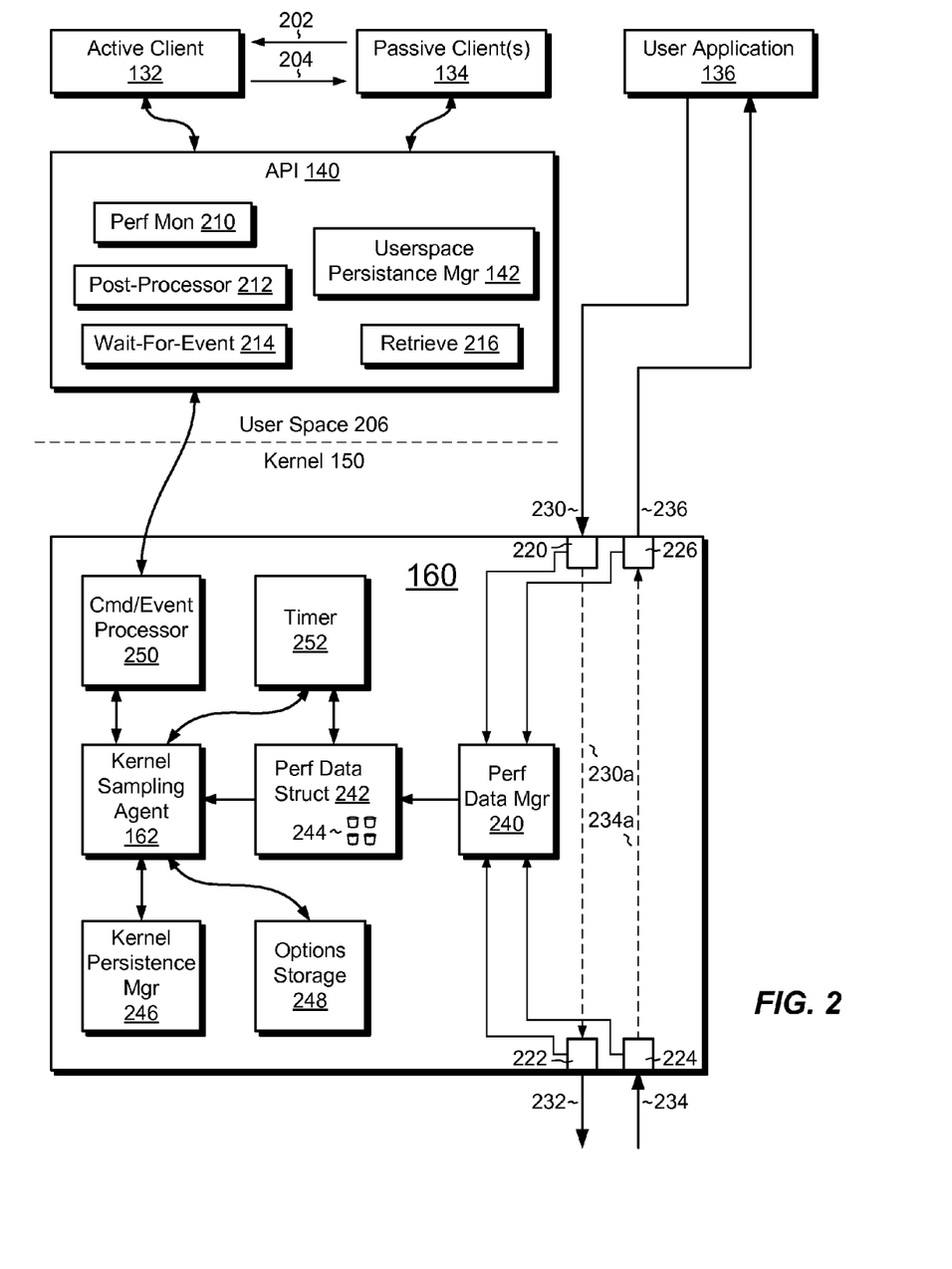
FIG. 2 is a block diagram of example portions of the host computing machine of FIG. 1, including, inter alia, a driver, an active client, and a passive client.

FIG. 2 shows different portions of the host 110 of FIG. 1 in greater detail. Constructs running in both the operating system kernel 150 and in userspace 206 are shown.

In the kernel 150, the multipathing driver 160 is seen to include I/O monitors 220, 222, 224, and 226, a performance data manager 240, and a performance data structure 242 (including data buckets 244). The multipathing driver 160 is also seen to include the kernel sampling agent 162, a kernel persistence manager 246, options storage 248, a command/event processor 250, and a timer 252. Although the performance data manager 240, the performance data structure 242, the kernel sampling agent 162, the kernel persistence manager 246, the options storage 248, the command/event processor 250, and a timer 252 are shown as being included within the multipathing driver 160, it is understood that some or all of these constructs may be located elsewhere in the kernel 150 but run in coordination with the multipathing driver 160.

Constructs in userspace 206 include the active client 132, one or more passive clients 134, the user application 136, and the API 140. The API 140 provides access to a performance monitor 210, a post-processor 212, a wait-for-event handler 214, a retrieving handler 216, and the userspace persistence manager 142. The API 140 is arranged to allow communication between the active client 132 and the multipathing driver 160, for setting up performance monitoring, obtaining performance data from the multipathing driver 160, post-processing the obtained performance data, and making the post-processed performance data available for consumption by the passive client(s) 134.

I/O monitors 220, 222, 224, and 226 measure performance data pertaining to outgoing I/O requests 230, 232 and returning I/O requests 234, 236. I/O requests 230 and 236 are respectively shown as originating from and being provided to the application program 136. It is understood that additional processing layers may be placed between the application program 136 and the driver 160; however, such layers are omitted here for the sake of simplicity.

In operation, the performance data manager 240 obtains the measured performance data and stores the data in the performance data structure 242, which includes the above-described data buckets 244. The kernel sampling agent 162 captures performance data from the performance data structure 242 at intervals marked by the timer 252. The timer 252 is configured to expire, or "wake up," at predetermined intervals. Each time the timer 252 wakes up, the kernel sampling agent 162 obtains another snapshot of the performance data structure 242 (or a portion thereof). Snapshots of sampled data from the performance data structure 242 are stored in the kernel persistence manager 246.

Preferably, each snapshot stored in the kernel persistence manager 246 is associated with an index, which is incremented each time a new snapshot is stored. Only a limited number of snapshots may be stored, beyond which oldest snapshots are typically discarded. The options storage 248 stores a value that designates the maximum number of snapshots that may be stored in the kernel persistence manager 246. The options storage 248 may also store the interval of the timer 252. The maximum number of snapshots and the sampling interval can preferably be adjusted by an administrative management program (not shown).

The command/event processor 250 is the primary means by which communication takes place between the multipathing driver 160 and software constructs in userspace 206. In some examples, the command/event processor 250 communicates with the API 140 using IOCTL (I/O Control) statements. The API 140 translates instructions from the active client 132 into IOCTL statements and returns results of IOCTL statements back to the active client 132. The command/event processor 250 also raises events to indicate when new snapshots of collected performance data are available.

The API 140 provides a means through which the applications 130 can control the multipathing driver 160 and manage performance data obtained from the multipathing driver 160. The API 140 includes pointers to software libraries in userspace 206 for performing various functions. Examples of constructs for performing these functions include the following:

The performance monitor handler 210: used by applications 130, such as the active client 132 or the passive client 134, and by the administrative manager, to turn on or off performance monitoring in the multipathing driver 160, to specify the number of snapshots to be stored in the kernel persistence manager 246, and to provide a user-defined sampling interval for the timer 252.

The wait-for-event handler 214: used by the active client 132 to listen for an event from the multipathing driver 160 when a new snapshot of performance data becomes available in the kernel persistence manager 246.

The retrieving handler 216: used by the active client 132 for obtaining snapshots from the multipathing driver 160.

The post-processor 212: used by the active client 132 to post-process snapshots of performance data retrieved from the multipathing driver 160 and to perform calculations between different performance data obtained in different snapshots.

The userspace persistence manager 142: stores post-processed performance data. Also stores the index of the most recent snapshot acquired from the kernel persistence manager 246. In some examples, controls access to post-processed data by various clients.

Although the API 140 is illustrated as a single construct, those skilled in the art will realize that the API 140 may include multiple APIs, such as one for communicating with applications 130 and one for communicating with the multipathing driver 160, for example.

In some examples, a single active client 132 and multiple passive clients 134 are provided. The active client 132 and passive client(s) 134 may be installed on the host 110 or off the host 110. Some clients may be on the host 110 while others may be off the host 110. Similarly, the API 140, or portions thereof, may be provided on or off the host 110.

The active client 132 can obtain performance data from the multipathing driver 160 by waiting for events from the multipathing driver 160 that indicate when new snapshots are ready. In an example, the driver 160 is configured to raise an event each time a new performance data snapshot is available. The active client 132 can issue a command (via the wait-for-event handler 214) that alerts the active client 132 when a next such event occurs. Upon being alerted of the event, the active client 132 can retrieve the new snapshot from the kernel persistence manager 246 of the driver 160 (e.g., using the retrieving handler 216).

In some examples, a subscription service is provided whereby passive clients 134 can issue subscriptions 202 to the active client 132 for new snapshots. When the active client 132 receives an event raised by the driver 160 in response to a wait-for-event command, the active client 132 can retrieve the new snapshot from the driver 160 (using the retrieving handler 216), post-process the new snapshot (using the post-processor 212), and store the newly post-processed data in the userspace persistence manager 142. The active client 132 can then send messages 204 to the various passive clients 134 to inform those clients that the new post-processed data are available. Using this subscription service, only the active client 132 disturbs the driver 160 for new snapshots, and this typically happens at most once per sampling interval. The passive clients 134 can access post-processed performance data from the userspace persistence manager 142, but these data are accessed entirely in userspace 206, without the need to interfere with the multipathing driver 160 and thereby impair its performance in processing I/O requests.

Also, the userspace persistence manager 142 stores the same dataset for all clients. Thus, not only does this approach avoid needless duplication of steps (and consequent inefficiencies), but it also avoids confusion that might otherwise occur if different clients were allowed to report results of different datasets acquired at different times and/or post-processed in different ways.

Details of collecting and processing performance data by the driver 160 will now be described with further reference to FIG. 2. Referring again to the driver 160, the I/O monitors 220, 222, 224, and 226 operate by collecting raw data, including the I/O size of I/O requests and timestamps indicating when such requests are encountered and whether the request is a read or a write. Performance data may be acquired for an I/O request as follows. An outgoing I/O request 230 is received by the I/O monitor 220. The I/O monitor 220 reads the size of the corresponding I/O from the I/O request 230 and obtains a timestamp to indicate when the I/O monitor 220 encounters the I/O request 230. The I/O request 230 then propagates through the driver 160 along a pathway 230a to the I/O monitor 222. The I/O monitor 222 obtains a timestamp to indicate the time that the I/O monitor 222 encounters the I/O request. An outgoing I/O request 232 is then forwarded from the driver 160 to lower levels of the I/O stack of the host 110 and eventually to the array 180. The I/O request 232 is processed by the array 180 and returned. A returning I/O request 234 is received by the I/O monitor 224, which obtains a timestamp to indicate the time of receipt, and propagates through the driver 160, along a pathway 234a, to the I/O monitor 226, which also obtains a timestamp. A processed returning I/O request 236 is then returned to higher levels of the I/O stack of the host 110.

The performance data manager 240 receives the I/O size of the I/O request from the I/O monitor 220 and receives timestamp information from all of the I/O monitors 220, 222, 224, and 226. The performance data manager 240 then calculates differences between timestamps to produce measures of I/O latency. These may include, for example, latency through the driver 160 (e.g., between I/O monitors 220 and 220, or between I/O monitors 224 and 226), external round trip latency (e.g., between I/O monitors 222 and 224), and total round trip latency (e.g., between I/O monitors 220 and 226), which includes driver latency in both directions as well as external latency to the array 180 and back.

The performance data obtained and/or calculated by the performance data manager 240 is stored in the performance data structure 242. The performance data structure 242 is preferably organized by LUN and by path, as well as by READs and WRITEs. The performance data structure 242 preferably stores performance data in the form of data buckets 244.

In some examples, the data buckets 244 store additional performance data besides counts of I/O requests. For instance, buckets 244 may also store sums of performance data values. Each bucket for I/O size can be configured to store (1) a count of I/O requests having I/O sizes that fall within the range of the bucket (as described above), (2) a sum of all I/O sizes counted in (1), and (3) a sum of all total round-trip latencies associated with I/O requests counted in (1). Additional values can be stored for each bucket, such as sums for other latency measurements.

Similar sums may be computed and stored for latency buckets. For instance, each bucket for total round-trip latency can be configured to store (1) a count of I/O requests having round-trip latencies that fall within the range of the bucket (as described above), (2) a sum of all total round-trip latencies counted in (1), and (3) a sum of all I/O sizes for each I/O request counted in (1). Similar sums can be computed and stored other latency measurements.

In some examples, bucket counts and sums can be stored together, for example, in an array data structure. The array data structure has an index that spans the number of ranges specified for the type of performance data to be counted (e.g., 16). For each index (range), the data array can store the count of metric values for the respective range as well as any sums computed. In some examples, sums of metric values can be computed and stored as indicated above, even when counts of metric values are not obtained or stored.

Storing sums of metric values in addition to bucket counts provides a rich set of accurate data from which to calculate aggregate I/O size, latency as a function of I/O size, average response times (sum of round-trip latency divided by I/O count) and throughput (sum of bytes transferred divided by the elapsed time between successive reads of the stored sums). Sums are calculated from raw performance data values and thus preserve accuracy that may be compromised if bucket counts alone are used. Although storing sums does consume additional kernel memory, it significantly improves the accuracy of metric reporting and may be preferred in some implementations.

In some examples, the performance data structure 242 also stores maximum and minimum values of performance data obtained over designated sampling intervals (e.g., intervals of the timer 252). Thus, the performance data structure 242 may store both the greatest and least I/O size of any I/O request processed during a particular sampling interval, as well as the greatest and least value of latency (or multiple latencies, where more than one latency value is computed). Multiple sets of maximum/minimum values may be saved (e.g., for each LUN, for each path, for READs, for WRITEs, and so forth), according to the perceived importance of such data and the amount of excess kernel memory that storing such values requires.

The kernel sampling agent 162 samples any or all of the performance data of the performance data structure 242 to produce a snapshot of such data for different intervals of the timer 252. As indicated, snapshots may be retrieved by the active client 132, post-processed, and stored in the userspace persistence manager 142 for access by any passive client(s) 134 in userspace 206.

Operation of the post-processor 212 will now be described with continued reference to FIG. 2. The post-processor 212 performs multiple operations on the snapshots of performance data retrieved from the multipathing driver 160. These include calculating differences between data captured in successive snapshots, calculating averages, calculating totals, normalizing data, and reducing the volume of data presented to clients. Post-processed data are stored in the userspace persistence manager 142.

In an example, the post-processor 212 calculates differences in bucket counts accumulated across successive snapshots. For example, changes in counts stored for each bucket reveal the number of new I/O requests processed during the sampling interval having I/O sizes or latencies that fall within the ranges of the respective buckets.

The post-processor 212 can also calculate summary data, such as averages and totals. For example, if snapshots include sums of performance data in addition to counts, the sums for different buckets can be added together to produce totals across all buckets for a particular measurement. Also, sums of I/O size values can be divided by the sampling interval to produce an indication of throughput over the sampling interval.

The post-processor 212 can also normalize performance data, such as by computing measures of throughput (e.g., total number of bytes written or read over the sampling interval, expressed in bytes per second). Expressing these measurements per unit time allows direct comparisons of snapshots, even when sampling intervals are non-uniform.

In addition, the post-processor 212 can consolidate data. For example, in some implementations, sixteen buckets are provided for each measurement. Sixteen may be a greater number of buckets than is desired by some customers. In these cases, the post-processor 212 can consolidate counts from the sixteen buckets into some other number of buckets, such as four buckets, by merging four groups of four contiguous ranges and adding together the bucket counts for each group. In some examples, data consolidation is done non-uniformly. In one example, where sixteen buckets are consolidated into four, the first five buckets could be consolidated into one bucket, the next three buckets could be consolidated into one bucket, the next two buckets could be consolidated into one bucket, and the remaining six buckets could be consolidated into one bucket.

In general, the post-processed data produced by the post-processor 212 and stored in the userspace persistence manager 142 is sufficiently relevant and comprehensive that it suits the needs of multiple clients for multiple purposes. Consequently, clients are able to obtain all the information they typically require about performance data of the multipathing driver 160 from the userspace persistence manager 142.

Figure 3:
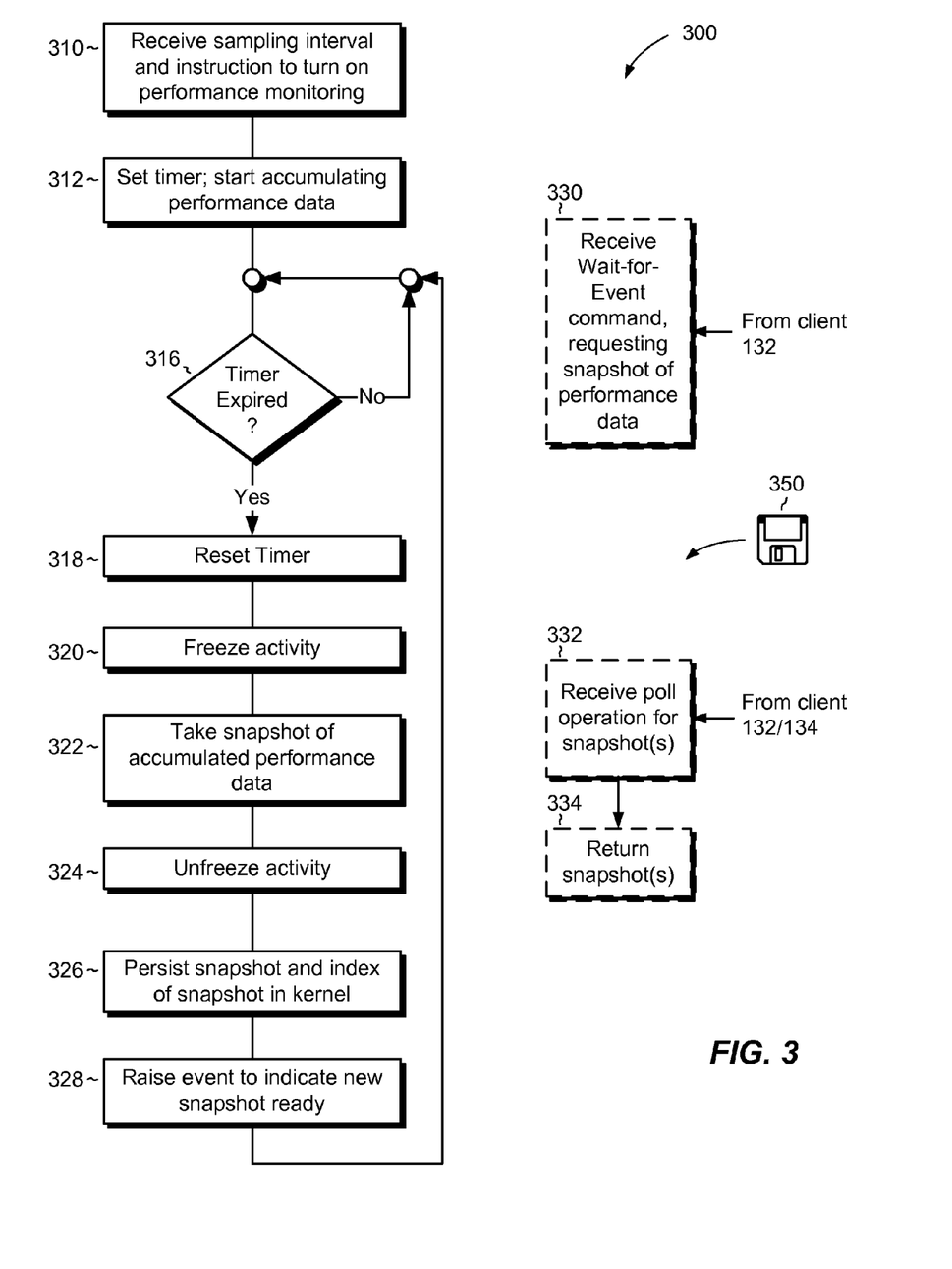
FIG. 3 is a flowchart showing an example process operable by the driver of FIG. 2.
Figure 4:
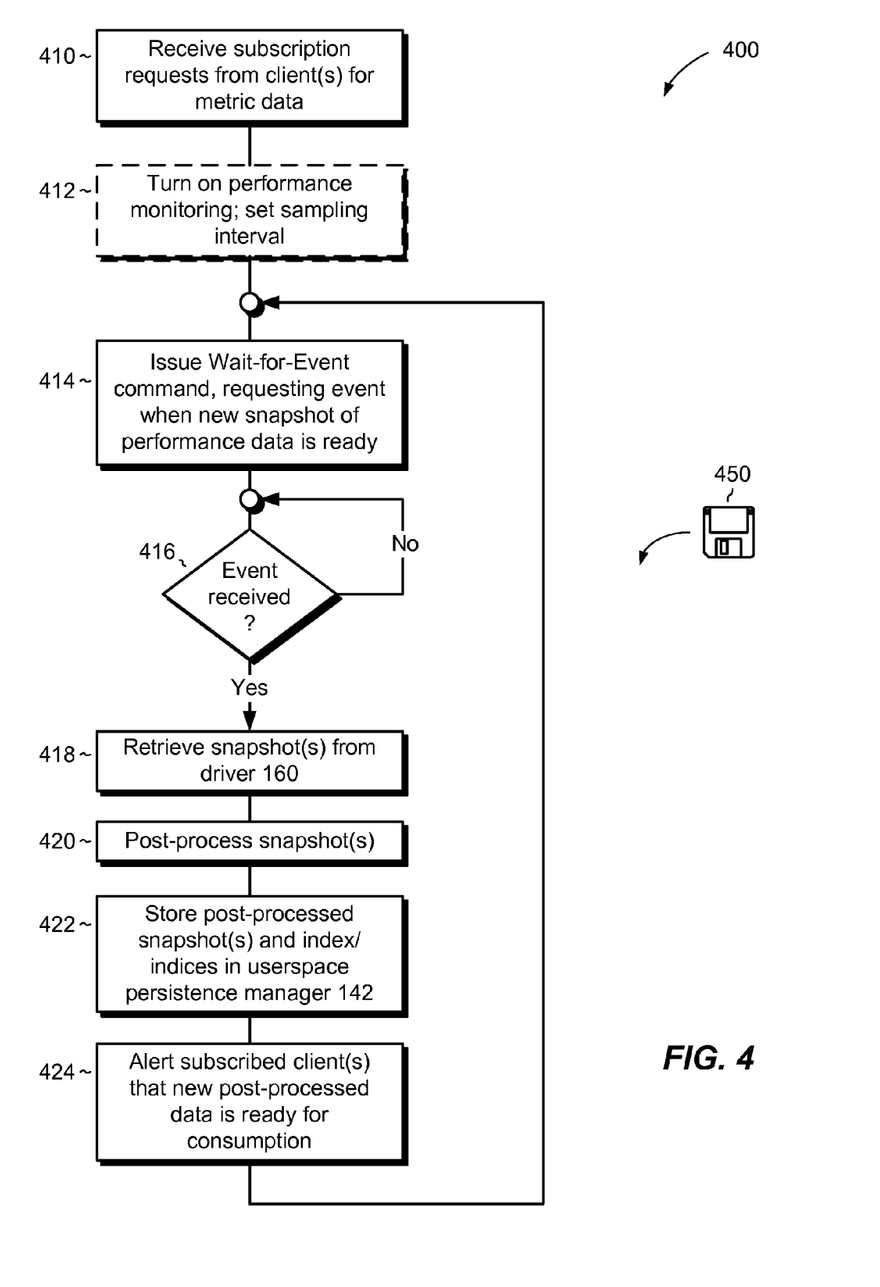
FIG. 4 is a flowchart showing an example process operable by the active client of FIG. 2.
Figure 5:
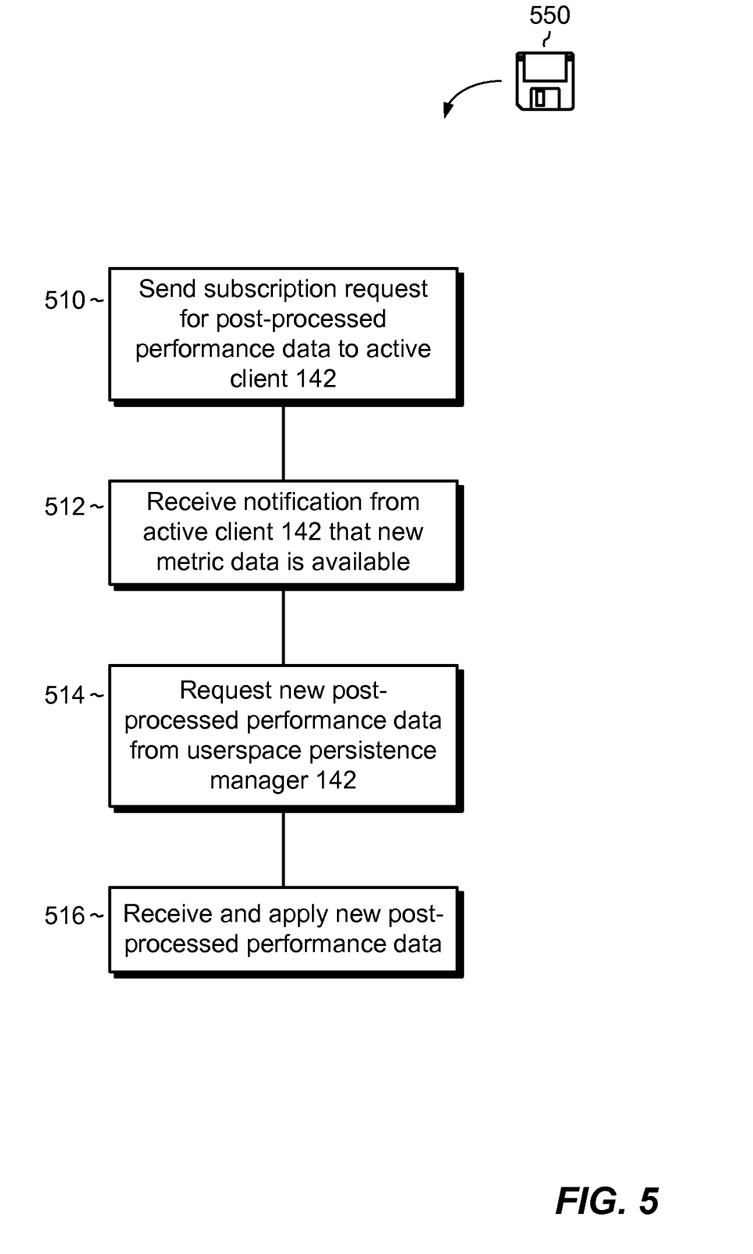
FIG. 5 is a flowchart showing an example process operable by the passive client of FIG. 2 for obtaining performance data through a subscription.

FIGS. 3-5 illustrate processes that may be carried out in connection with the host 110. These processes are typically performed by the software constructs described in connection with FIGS. 1 and 2, which reside in the memory 120 of the host 110 and are run by the set of processors 116. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 3 shows an example process 300 operable by the multipathing driver 160 for sampling performance data and returning snapshots of performance data to clients. At step 310, an instruction is received to turn on performance monitoring. A sampling interval is also received for configuring the timer 252. The instruction and time interval may be provided by the active client 132, a passive client 134, or some other client. In one example, an administrative management program is run on the host 110, and one or more instructions for turning on performance monitoring and setting the sampling interval are received via a CLI of the administrative management program.

At step 312, the timer 252 is started and begins counting down the specified interval. As I/O requests are processed, data accumulates in the performance data structure 242, including in the buckets 244. Preferably, the timer 252 is run in a thread of the driver 160, which includes multiple threads running in effect simultaneously.

At step 316, the multipathing driver 160 waits for the timer 252 to expire, while performance data continues to accumulate in the performance data structure 242. When the timer 252 expires, control proceeds to step 318.

At step 318, the timer 252 is reset and begins counting down again. Using the timer 252 in a repetitive manner allows the driver 160 effectively to collect performance data at a sampling rate substantially equal to the inverse of the interval of the timer 252.

At step 320, the processing of I/O requests is frozen. I/O requests, for a particular LUN 184a-k or for all LUNs, is temporarily halted.

At step 322 the kernel sampling agent 162 takes a snapshot of the accumulated performance data. For example, values of all bucket counters, sums, and max/min values are captured.

At step 324, the processing of I/O requests is unfrozen, and the driver 160 resumes processing I/O requests as they arrive.

At step 326, the captured snapshot is stored in the kernel persistence manager 246. A snapshot index is incremented and stored in the kernel persistence manager 246 along with the snapshot. The kernel persistence manager 246 may store multiple snapshots and associated indices corresponding to different sampling intervals.

At step 328, the command/event processor 250 raises an event to indicate that a new snapshot of performance data is ready to be retrieved. Control then returns to step 316, where the thread of the multipathing driver 160 once again waits for the timer 252 to expire.

The thread of the multipathing driver 160 remains in the loop described by steps 316-328 until performance monitoring is turned off.

Asynchronously to the above-described process of steps 310-328, the multipathing driver 160 may receive a wait-for-event command at step 330 from the active client 132 via the wait-for-event handler 214 of the API 140. After receiving this command, the process of steps 310-328 continues as usual, but the next time an event is raised (i.e., after the next iteration of step 328), the wait-for-event handler 214 may receive the raised event and inform the active client 132 that a new snapshot is ready.

At step 332, a retrieving command is received from the active client 132 via the retrieving handler 216 of the API 140. At step 334, the command/event processor 250 returns the new snapshot to the active client 132.

Although the various activities of the process 300 are described as being conducted by the multipathing driver 160, it is understood that the constructs that perform the various steps may alternatively be situated elsewhere in the operating system kernel 150, but in close coordination with the multipathing driver 160.

FIG. 4 shows an example process 400 operable by the active client 132. At step 410, the active client 132 receives one or more subscription requests 202 for metric data. The subscription requests are typically received from passive clients 134, although they may also be received from other types of clients. The passive clients 134 or other clients may run on the host 110 or off the host 110. Some may be run on the host 110 while others are run off the host 110.

At step 412, performance monitoring is turned on and the sampling interval is set for the timer 252. Step 412 is illustrated with dashed lines to indicate that it may be performed at any time and is only optionally performed by the active client 132. For example, performance monitoring may be turned on in response to a user manually entering a command in an administrative management tool.

At step 414, the active client 132 issues a wait-for-event command to the multipathing driver 160. The wait-for-event command is processed by the wait-for-event handler 214 of the API 140. The wait-for-event handler 214 listens for an event to be raised by the driver 160 that indicates that a new snapshot is ready for pickup. A time-out may be specified with the wait-for-event command to direct the wait-for-event handler 214 to stop listening after a specified period of time expires. The time-out period should be longer than the interval of the timer 252 to ensure proper operation.

At step 416, the active client 132 waits to be informed that the event has occurred that indicates that a new snapshot is ready. When the active client 132 receives such indication, control proceeds to step 418.

At step 418, the active client 132 retrieves the new snapshot from the driver 160 (e.g., using the retrieving construct 216 of the API 140). The active client 132 also receives the current index of the snapshot read back from the driver 160.

At step 420, the active client 132 invokes the post-processor 212 to post-process the snapshot. As indicated in connection with FIG. 2, post-processing may involve multiple operations, including identifying differences in performance data between successive snapshots, computing totals, averages, and other aggregate statistics, and consolidating data arriving in buckets.

At step 422, the active client 132 stores the post-processed snapshot and snapshot index in the userspace persistence manager 142. Post-processed metrics are then available for access by other clients.

At step 424, the active client 132 alerts any subscriber clients (e.g., passive clients 134 and any other clients that have subscribed to performance data from the active client 132) that new post-processed data is ready for consumption by sending messages 204 to such clients. In some examples, the active client 132 also sends the actual snapshot or the post-processed data.

Control then returns to step 414, where the active client 132 again issues a wait-for-event command to request the next snapshot. The active client 132 remains in the loop including steps 414-424 indefinitely, e.g., until performance monitoring is turned off. Because the active client 132 only accesses the driver 160 after the driver 160 has raised an event indicating that a new snapshot is ready, retrieving performance data from the driver 160 is typically limited to once per sampling interval. With sampling intervals set on the order of once per minute, the effect of the active client 132 on the driver 160 is negligible. Other clients requiring access to performance data from the driver may obtain such data from the userspace persistence manager 142, without causing the driver 160 to experience any loss of performance.

FIG. 5 shows a process that may be conducted by any of the passive clients 134 for obtaining performance data using subscriptions.

At step 510, the passive client 134 sends a subscription request 202 to the active client 132, to request that the passive client 134 be alerted when new post-processed snapshots are available.

At step 512, after some time has passed, the passive client 134 receives a message 204 from the active client 132 that new post-processed data is ready.

At step 514, the passive client 134 contacts the userspace persistence manager 142 to request the new post-processed data. At step 516, the passive client 134 receives the new post-processed data from the userspace persistence manager 142.

It is understood that the process of FIG. 5 can be conducted by multiple passive clients 134. Such passive clients 134 may operate independently from one another or in coordination, and may be located on the host 110 or off the host 110.

As indicated, the kernel persistence manager 246 of the driver 160 may store multiple snapshots corresponding to multiple respective time intervals, where each snapshot is associated with an index. In some examples, the active client 132 can request snapshots by index number. The snapshot returned is then the requested snapshot, rather than necessarily the newest snapshot. Multiple snapshots may be requested at once. For example, the active client 132 can specify the indices of multiple snapshots, and the retrieve construct 216 will return all of the requested snapshots to the active client 132. In some examples, the active client 132 may query the driver 160 to obtain the number of snapshots stored and the time until the next snapshot is available. Indices are also used to identify sets of post-processed data. In an example, sets of post-processed data are associated with the same indices used to identify the respective snapshots from which they are processed.

An improved technique has been described for managing access to performance data of a multipathing kernel driver 160. The technique includes acquiring snapshots of performance data in the driver 160 at identified instants of time marked by the driver 160 itself and transferring the performance data to a userspace persistence manager 142 outside the operating system kernel 150, where client applications, such as the active client 132 and any number of passive clients 134, can access the performance data and/or post-processed versions thereof without disturbing the operation of the driver 160. Communications with the driver 160, and burdensome interruptions of I/O processing that follow, are thereby reduced, allowing the driver 160 to perform its primary functions of processing I/O requests more efficiently.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, it is shown and described that the driver 160 stores performance data in the form of data buckets. However, this is merely an example. Alternatively, performance data may be stored by the driver 160 in other forms, such as raw measurements. The invention is therefore not limited to any particular form of performance data.

Along similar lines, the performance data is described as including I/O size, I/O latency, and numbers of I/O requests. Other types of performance data may be collected and stored, however. The invention is therefore not limited to any particular type of performance data.

Also, the driver 160 has been shown and described as a multipathing driver. However, this again is merely an example. The driver 160 can be any type of driver that runs within the kernel of a host operating system.

Also, computing activities are shown and described as taking place on a host computing system 110, which is connected to a storage array 180. Although the techniques described herein are particularly advantageous in data processing systems, the invention is not limited to these types of systems and may be used in any type of computing environment.

Further, it has been shown and described that the active client 132 is alerted of the availability of new snapshots of performance data in an event-driven manner, i.e., using the wait-for-event command. The active client 132 is not limited to this command, however. Alternatively, the active client 132, or any client, may poll the driver 160, e.g., it can operate in a loop where it repeatedly requests that the driver 160 respond indicating whether a new snapshot is ready. The client, once it receives an affirmative response, can retrieve the snapshot as described above.

Further still, the improvement or portions thereof may be embodied as one or more non-transient computer-readable storage media, such as a magnetic disk, magnetic tape, compact disk, DVD, optical disk, flash memory, Application Specific Integrated Circuit (ASIC), Field Programmable Gate Array (FPGA), and the like (shown by way of example as media 350, 450, and 550 in FIGS. 3, 4, and 5. The media may be encoded with instructions which, when executed on one or more computers or other processors, perform methods that implement the various processes described herein. Such media may be considered articles of manufacture or machines, and may be transportable from one machine to another.

Those skilled in the art will therefore understand that various changes in form and detail may be made to the embodiments disclosed herein without departing from the scope of the invention.

What is claimed is:

1. A method of managing access to performance data of a driver running in an operating system kernel, comprising:
    recording driver performance data within the kernel over a predetermined interval of time marked by a timer running within the kernel;
    after expiration of the timer, performing a collecting operation within the kernel to collect the recorded performance data;
    transferring the collected performance data to a persistence manager outside the kernel;
    performing additional collecting operations within the kernel to collect performance data at a rate substantially equal to the inverse of the predetermined interval of time; and
    temporarily persisting, in the kernel, results of the additional collecting operations.

2. The method of claim 1, further comprising:
    after expiration of the timer and before performing the collecting operation, freezing an activity of the driver to prevent further performance data from accumulating; and
    after performing the collecting operation, unfreezing the activity of the driver to resume recording performance data.

3. The method of claim 1, further comprising calculating a set of metrics by computing changes in performance data collected during one collecting operation with performance data collected during an immediately prior collecting operation.

4. The method of claim 1, further comprising:
    receiving a request from a listener outside the kernel to return a result of at least one of the additional collecting operations;
    raising an event within the kernel when the result is available to alert the listener running outside the kernel that the result is available; and
    returning the result to the listener.

5. The method of claim 1, further comprising:
    receiving a request from a listener outside the kernel to return a result of at least one of the additional collecting operations; and
    returning the result to the listener outside the kernel in response to the request.

6. The method of claim 1, further comprising receiving input from a user designating the predetermined interval of time.

7. The method of claim 1, further comprising:
    issuing a request to the driver to return a result of at least one of the additional collecting operations; and
    receiving the result from the driver by the listener outside the kernel in response to the request.

8. The method of claim 1, wherein the performance data collected during the collecting operation and the additional collecting operations each form a snapshot of performance data, and wherein each snapshot of performance data is identified with an index.

9. The method of claim 8, further comprising, after transferring the collected performance data to the persistence manager outside the kernel, post-processing the snapshots of performance data to produce respective sets of post-processed performance data, wherein each set of post-processed performance data has an index that matches the index of a snapshot of performance data from which it is post-processed.

10. The method of claim 1, further comprising:
    running a first client outside the kernel;
    receiving subscription requests, by the first client from at least one second client running outside the kernel, for post-processed driver performance data; and
    alerting the second client(s) when the persistence manager is updated with new post-processed driver performance data.

11. The method of claim 10, further comprising:
    issuing a command by the first client to the driver to return driver performance data after the predetermined interval of time expires;
    detecting an event from the driver when the driver performance data is available; and
    acquiring the driver performance data from the driver in response to detecting the event.

12. The method of claim 10, further comprising:
    running a second client outside the kernel;
    issuing a subscription request, by the second client to the first client, for driver performance data;
    receiving an alert, by the second client from the first client, when the persistence manager is updated with new post-processed performance data; and
    retrieving performance data by the second client from the persistence manager after the second client receives the alert.

13. The method of claim 1, wherein the driver is a multipathing driver and wherein the method further comprises, by the driver:
    counting I/O requests handled by the driver that fall into each of a plurality of I/O size ranges to produce multiple I/O size counts, one for each I/O size range; and
    providing the I/O size counts for inclusion in the driver performance data.

14. The method of claim 13, wherein the method further comprises, by the driver:
    counting I/O requests handled by the driver that fall into each of a plurality of I/O latency ranges to produce multiple I/O latency counts, one for each I/O latency range; and
    providing the I/O latency counts for inclusion in the driver performance data.

15. The method of claim 14, wherein the method further comprises, by the driver:
    computing, for each I/O size range, a sum of all I/O sizes of I/O requests counted for the respective range during the predetermined interval of time to produce an I/O size total for that I/O size range;
    computing, for each I/O size range, a sum of all I/O latencies of I/O requests counted for the respective range during the predetermined interval of time to produce an I/O latency total for that I/O size range;
    computing, for each I/O latency range, a sum of all I/O latencies of I/O requests counted for the respective range to produce an I/O latency total for that I/O latency range;

computing, for each I/O latency range, a sum of all I/O sizes of I/O requests counted for the respective range to produce an I/O size total for that I/O latency range; and providing the I/O size totals and I/O latency totals for inclusion in the driver performance data.

16. The method of claim 14, wherein the method further comprises, by the driver, persisting maximum and minimum values of I/O size and I/O latency of I/O requests handled by the driver during the predetermined interval of time.

17. The method of claim 14, further comprising post-processing the collected performance data outside the kernel to produce a post-processed set of performance data, wherein post-processing includes calculating differences in counts of the I/O size counters and of the I/O latency counters obtained over consecutive iterations of the additional collecting operations.

18. The method of claim 17, wherein post-processing the sampled performance data outside the kernel further includes:

consolidating counts from the I/O size counters to produce a lesser number of I/O size counts; and consolidating counts from the I/O latency counters to produce a lesser number of I/O latency counts.

19. The method of claim 18, wherein post-processing further includes normalizing driver performance data as a function of time to facilitate comparison of different sets of performance data collected over different time intervals.

20. A computing device, comprising:

a set of processors; and memory, coupled to the set of processors, the memory constructed and arranged to store instructions executable by the set of processors, wherein the set of processors executing instructions from the memory forms a specialized circuit constructed and arranged to:

record driver performance data within the kernel over a predetermined interval of time marked by a timer running within the kernel;

after expiration of the timer, perform a collecting operation within the kernel to collect the collected performance data;

transfer the collected performance data to a persistence manager outside the kernel;

perform additional collecting operations within the kernel to collect performance data at a rate substantially equal to the inverse of the predetermined interval of time; and temporarily persist, in the kernel, results of the additional collecting operations.

21. A non-transitory computer readable medium including instructions which, when executed by a set of processors of a computing device, cause the set of processors to perform a method of managing access to performance data of a driver running in an operating system kernel, the method comprising:

recording driver performance data within the kernel over a predetermined interval of time marked by a timer running within the kernel;

after expiration of the timer, performing a collecting operation within the kernel to collect the collected performance data;

transferring the collected performance data to a persistence manager outside the kernel;

performing additional collecting operations within the kernel to collect performance data at a rate substantially equal to the inverse of the predetermined interval of time; and temporarily persisting, in the kernel, results of the additional collecting operations.

22. The non-transitory computer readable medium of claim 21, wherein the method further comprises:

after expiration of the timer and before performing the collecting operation, freezing an activity of the driver to prevent further performance data from accumulating; and after performing the collecting operation, unfreezing the activity of the driver to resume recording performance data.

23. The non-transitory computer readable medium of claim 21, wherein the method further comprises calculating a set of metrics by computing changes in performance data collected during one collecting operation with performance data collected during an immediately prior collecting operation.

* * * * *